United States Patent [19]

Davis et al.

[11] 4,162,650
[45] Jul. 31, 1979

[54] BARBEQUE PIT APPARATUS

[76] Inventors: McKinley D. Davis, 210 Ridge Dr.;
Robert Stearnes, 324 Ridge Dr., both
of DeKalb, Ill. 60115; Lemuel Carter,
Jr., 4012 W. 19th Pl., Gary, Ind.
46404

[21] Appl. No.: 903,918

[22] Filed: May 8, 1978

[51] Int. Cl.² ............................................. A47J 37/00
[52] U.S. Cl. ......................................... 99/419; 99/420
[58] Field of Search .............. 99/419, 421 R, 421 HV,
99/421 V, 444–448, 450, 339, 386, 420; 126/25
B; 211/495, 59.1, 125, 163, 175, 184

[56] References Cited

U.S. PATENT DOCUMENTS

| 2,173,024 | 9/1939 | Park | 99/339 X |
| 2,465,611 | 3/1949 | Singer | 99/386 X |
| 2,846,941 | 8/1958 | Goodwin | 99/450 X |
| 3,025,783 | 3/1962 | Coudek | 99/448 X |
| 3,088,393 | 5/1963 | Huckabee | 99/450 X |
| 3,208,808 | 9/1965 | Knapp | 99/448 X |
| 3,240,147 | 3/1966 | Farber et al. | 99/446 X |
| 3,331,310 | 7/1967 | White | 99/421 P |
| 3,410,261 | 11/1968 | Cooper et al. | 126/25 B |
| 3,511,222 | 5/1970 | Miller | 99/450 X |
| 3,550,525 | 12/1970 | Rabello | 99/448 X |

FOREIGN PATENT DOCUMENTS 2515658 of 1970 Fed. Rep. of Germany ........ 99/421 V
371514 of 1932 United Kingdom ...................... 99/444

Primary Examiner—Harvey C. Hornsby
Assistant Examiner—Arthur O. Henderson
Attorney, Agent, or Firm—Gipple & Hale

[57] ABSTRACT

An enclosed cooking apparatus for barbequeing meat in which a fire box is provided for the burning of charcoal and logs. A pan is supported over the burning area and is filled with water which is heated into steam. The steam entrains the smoke generated during the cooking process and provides for rapid heat transfer while the pan additionally serves to receive fat and grease drippings from the meat for subsequent removal. Meat such as ribs are supported within the apparatus over the pan by a plurality of removable skewer assemblies arranged in side-by-side relationship, each of the skewer assemblies includes upstanding skewers on which the ribs are impaled, the upper ends of the skewers being arranged to support one or more racks in a horizontally disposed position so that the smoke and steam circulating through the enclosed apparatus performs a cooking and smoking operation on both the skewered meat and the meat supported on the racks.

12 Claims, 7 Drawing Figures

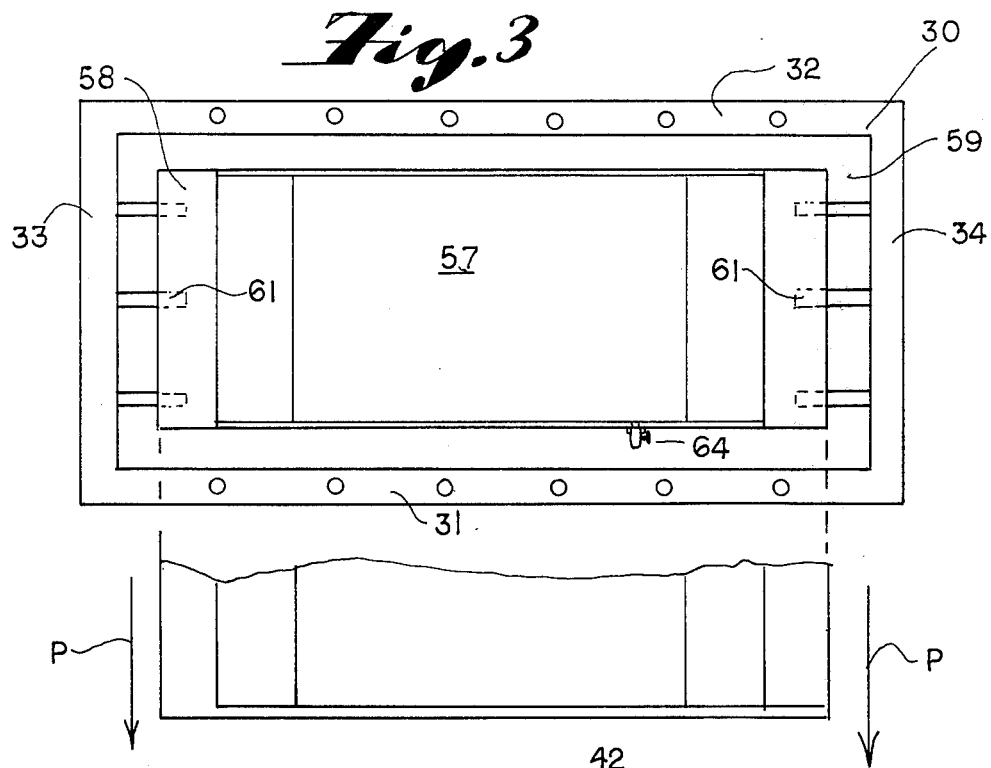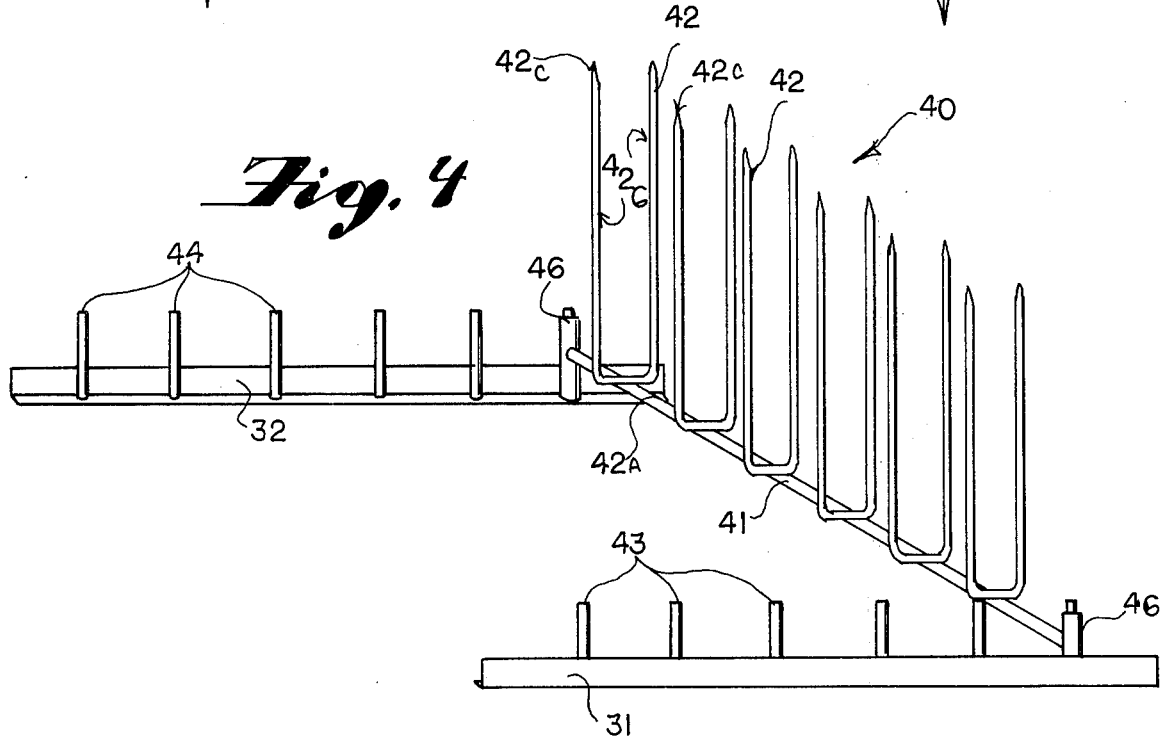

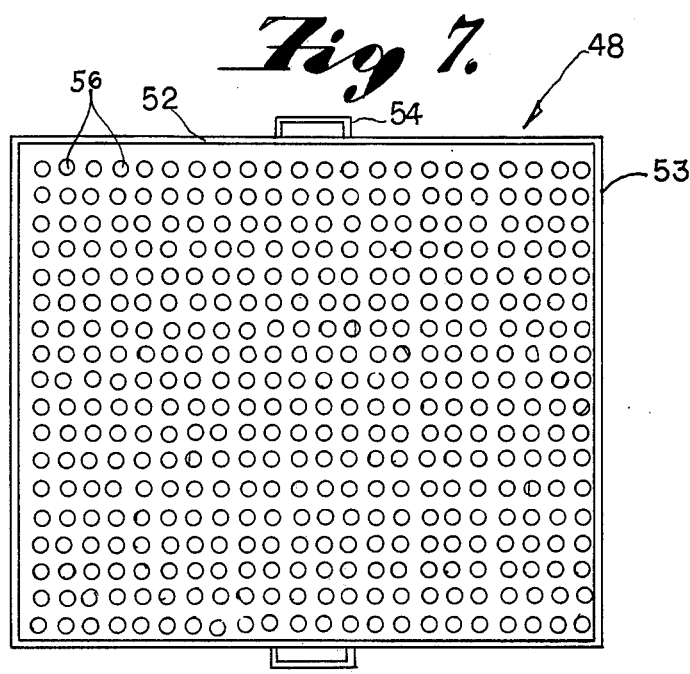
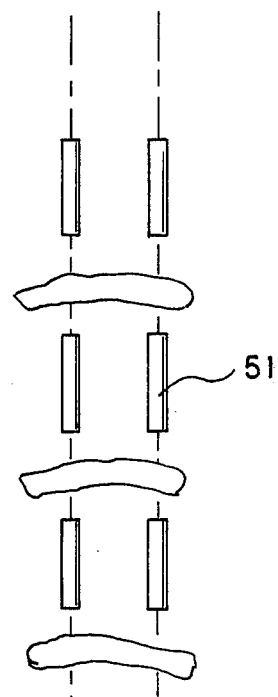
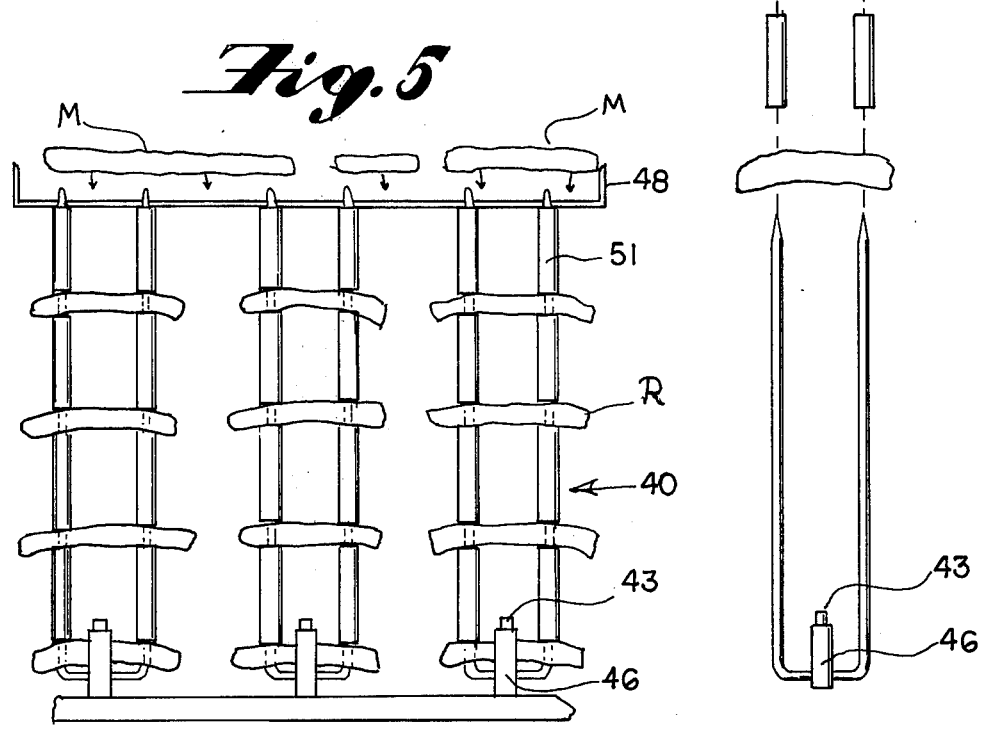

BARBEQUE PIT APPARATUS

BACKGROUND OF THE INVENTION

The present invention generally relates to cooking apparatus and more particularly to apparatus for barbequeing meat.

A well known technique for cooking meat such as pork, chicken, beef or the like, is a process known as barbequeing. In barbequeing, meat is suitably supported within an enclosure and is subjected to heat and smoke, so that as the meat cooks a smoke flavor is imparted to the meat. Conventionally, the smoke is produced by the burning of fuel such as charcoal and/or wood such as hickory logs which impart a flavor to the meat that is particularly palatable and commercially desirable. Present day barbeque pits are characterized by certain limitations such as the tendency of fat or grease dripping from the meat during the cooking process to fall onto the burning charcoal and/or logs imparting an undesirable burnt taste to the meat and frequently producing flames which char the meat as well as creating potential fire hazards. It is also well known that the barbequeing process can be more effectively carried out if the meat is subjected to moisture, thereby preventing the drying out or overcooking of the meat. Various techniques have been proposed for adding moisture to the meat during the barbequeing process as well as for eliminating the undesirable effects of grease dripping on the burning fuel. However, such present day techniques are characterized by many limitations including the requirement of complex, expensive structures with low production rates which do not attain the desired quality for the end product.

Of even greater consideration has been the need for reducing the cost of the barbequeing operation so as to hold the price of the end product at a reasonable level without sacrificing quality. Since it is necessary that the meat be positioned in the barbeque pit in such a way as to provide free circulation of the smoke and cooking heat along the entire surfaces of the meat for the proper barbequeing effect, this has created a limitation on the quantity of meat which can be cooked during a single operation. Enlarging the cooking apparatus to accommodate larger quantities of meat in many cases would be prohibitively expensive so that with present day apparatus the amount of meat which can be cooked with a single quantity of fuel is limited thereby not only limiting production, but making barbequeing meat a relatively inefficient and expensive operation. Furthermore, constant effort has been made to increase the quality and taste of barbequeing meat for consumer appeal.

DESCRIPTION OF THE PRIOR ART

Various barbequeing equipment has been used, some of which utilize components found in the present invention.

U.S. Pat. No. 3,299,800 is of interest as it shows a barbeque apparatus in the bottom of which is disposed a fire pan for fuel, such as charcoal and above which is disposed a water pan so that food placed on the racks may be subjected to both heat and steam for a cooking operation. U.S. Pat. No. 2,049,481 discloses a "U" shaped skewer for a roaster under which is disposed a pan for collecting juices. A basket is also provided in which additional food may be cooked. U.S. Pat. No. 3,053,169 discloses a spit-type roaster using skewers and U.S. Pat. Nos. 1,588,530 and 3,956,979 are of interest for their showing of upstanding spits or skewers used in roasting apparatus.

U.S. Pat. No. 1,732,010 shows a pan in which juices from roasted meat in a roaster are collected and subsequently sprayed continuously over the meat during the roasting operation while U.S. Pat. Nos. 3,756,140, 3,498,211, 2,533,080 and 3,967,547 are of interest for their showing of containers for collecting juices during a barbequeing or roasting operation for subsequent disposal. Also of interest are U.S. Pat. Nos. 1,854,850 and 3,524,403.

SUMMARY OF THE INVENTION

The present invention comprises a barbeque apparatus having a frame in the lower portion of which is disposed a fire box for burning of charcoal and hickory logs. A removable humidifying pan in supported on the frame above the fire box on inwardly projecting pins located at each end of the frame. Pairs of aligned pins are disposed on the frame above the humidifying pan which are arranged to support a plurality of support members in laterally disposed relationship, each of the support members having suitably secured thereto a plurality of upstanding "U" shaped skewers arranged in uniformly spaced relationship along the length of the member. Each member and its attached skewers is arranged to be removably supported on an aligned pair of pins by means of an upstanding sleeve at either end of the member into which the pins are inserted. A series of spacer sleeves are placed on the skewers to hold and space meat slabs in a substantially fixed position on the skewers. A rack is disposed above the skewers on which large sections of meat may be positioned for cooking at the same time that ribs or the like disposed on the skewers are being cooked.

Thus the invention provides a new and novel barbeque apparatus in which large amounts of meat may be cooked in a single operation utilizing a lesser percentage of fuel than that used by conventional methods. In a conventional pit of similar dimensions about 75 pounds of meat can be prepared in one loading while in the present invention around 300 pounds of meat can be prepared in one loading.

An object of this invention is to provide a new and novel barbeque apparatus in which a large quantity of meat may be cooked with smoke laden steam to provide meat of high quality and of uniform taste, color and tenderness at a high rate of production and in a minimum of time so as to produce a cooked meat product which is relatively low in cost and to eliminate a significant number of manhours in the time required to tend to the cooking of the product. The barbequeing of meat may be carried out without the need for turning, basting and the like, with the operator only being required to load and unload the meat product during the entire cooking operation.

A further object of this invention is to provide a new and novel barbeque pit which avoids the coating of the cooking surfaces by dripping grease, thereby providing a safe, clean cooking facility eliminating health hazards and fire hazards. The grease and drippings that develop while using a conventional pit coat the cooking surfaces and the fuels, thus causing fire hazards. The clean cooking facility eliminates the health hazards while the collection of drippings in the humidifying pan prevent their coating the pit surfaces.

BRIEF DESCRIPTION OF THE DRAWINGS

An understanding of the present invention will become apparent upon consideration of the following detailed description of specific embodiments thereof, especially when taken in conjunction with the accompanying drawings, in which:

FIG. 3 is a top plan view taken substantially along line 3'—3' of FIG. 2 in the direction of the arrows with an exploded broken away partial view of the pan;

FIG. 4 is a perspective view of a mounted skewer assembly used with the apparatus;

FIG. 5 is an elevational view, partially in section of a portion of the skewer apparatus of FIG. 2 loaded with meat for a barbequeing operation;

FIG. 6 is an exploded view of a skewer and associated spacer sleeves in positional relationship with the meat to be barbequed; and FIG. 7 is a top plan view of a meat rack used in in the cooking apparatus.

DETAILED DESCRIPTION OF THE DRAWINGS

Figure 1:
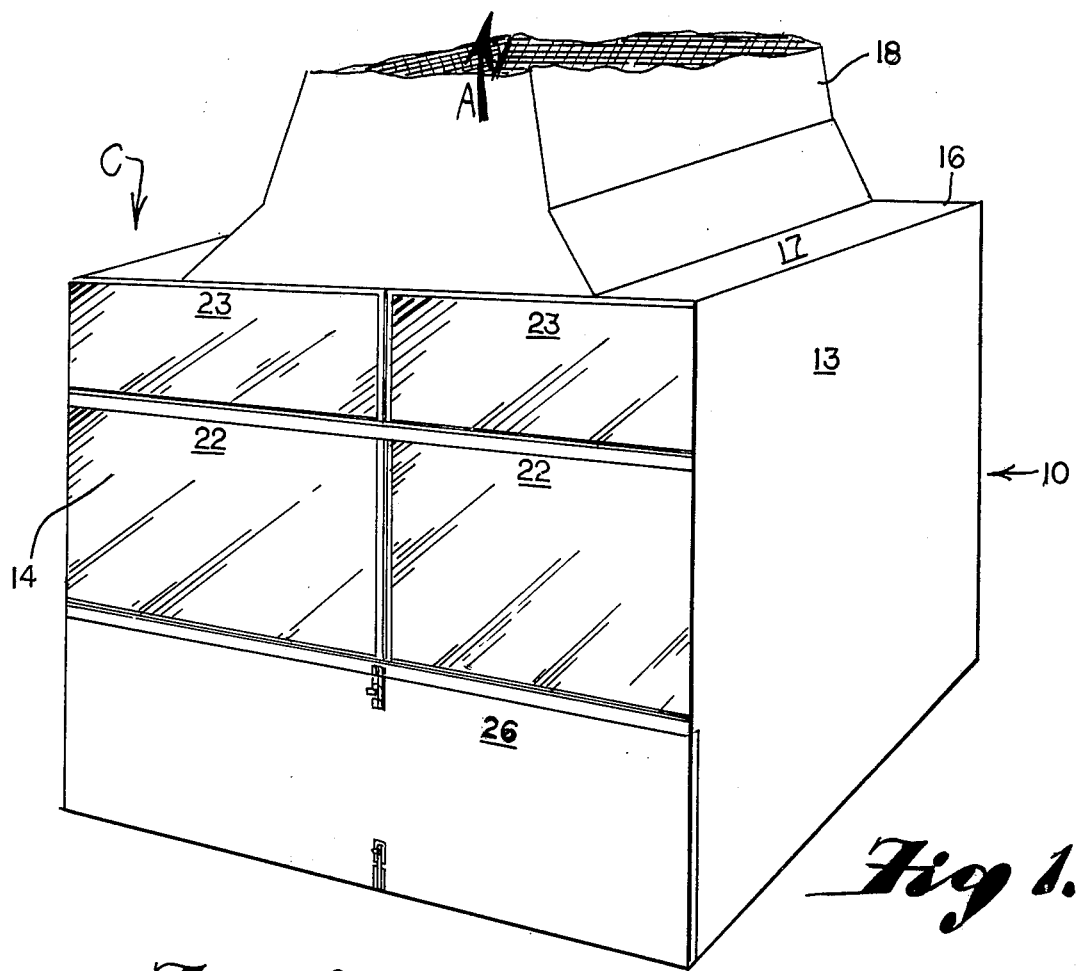
FIG. 1 is a perspective view of a cooking apparatus constructed in accordance with the invention.

As specifically illustrative of the invention and referring now to FIG. 1, there is shown a cooking apparatus designated generally by the letter C which includes a housing 10 having side walls 12 and 13 and front and rear walls 14 and 16 respectively. The side walls and rear wall can be constructed of fire brick, steel or any other suitable material. The cooking apparatus C also includes a roof 17 having a suitable opening over which is disposed a stack or flue 18. Cooking gases are conducted from the housing 10 through flue 18 during the cooking operation in the direction of the arrow A.

Figure 2:
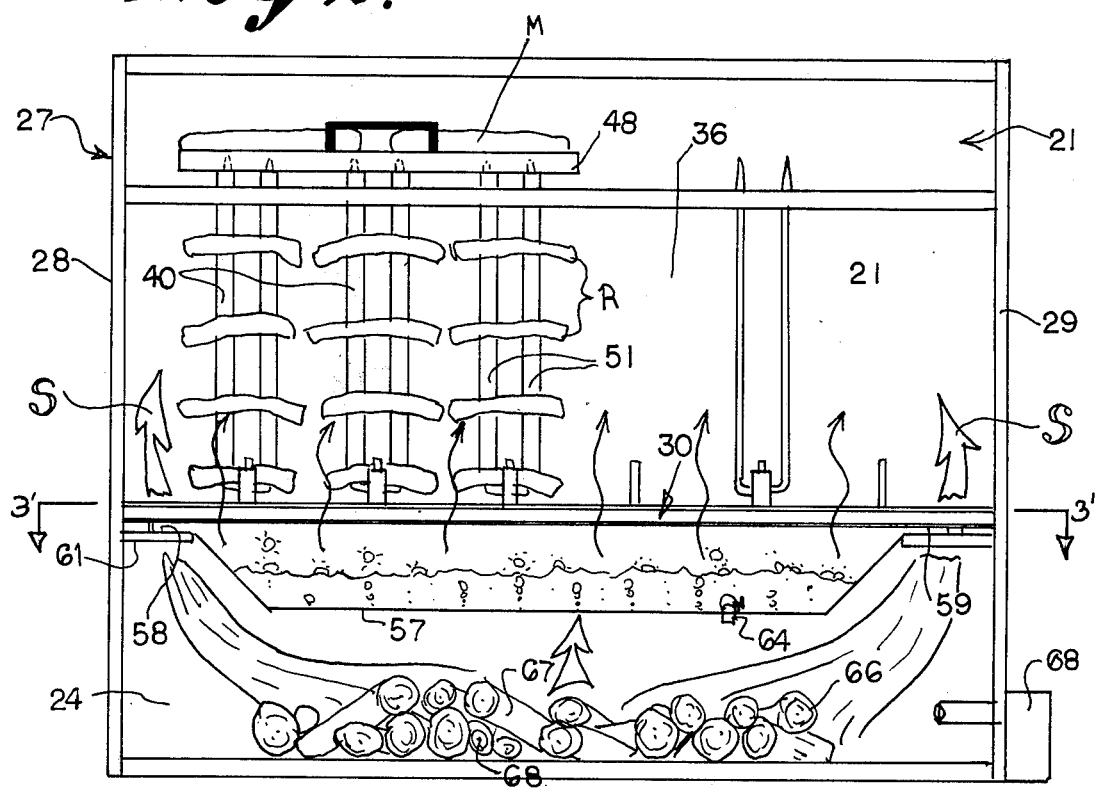
FIG. 2 is a side elevational view with a side wall removed to present the interior of the cooking apparatus of FIG. 1 illustrating a barbequeing operation.

The preferred embodiment and mode of the invention is shown in FIG. 2. The housing front, rear and side walls 12-14, 16 and roof 17 define an interior chamber designated generally by the numeral 21. The front wall 14 preferably includes pairs of doors or sliding glass panels 22 and 23, which permit viewing and access to the enclosure interior 21 for positioning meat therein for the barbequeing operation. The lower portion of the enclosure interior 21 comprises a combustion chamber or fire box 24 in which fuel is burned for producing cooking heat and smoke for the barbequeing operation. In the illustrated embodiment, the front wall 14 also includes a removable steel panel 26 which provides access to the combustion chamber 24.

The cooking apparatus C also includes a frame designated generally by the numeral 27. The frame 27 includes vertically extending side frame members 28, 29 and a support assembly 30 constructed with front and rear cross member angle irons 31, 32 interconnected at corresponding ends by side members 33, 34 as shown best in FIG. 3. The frame members 31-34 are positioned adjacent the top of the combustion chamber 24 with the portion of the interior 21 above the frame members 31-34 comprising a cooking chamber 36.

In order to support meat to be cooked or barbequed in cooking apparatus C, a plurality of skewer assemblies 40 are provided. Means are provided for supporting the skewer assemblies 40 in side-by-side, parallel relationship as shown best in FIGS. 2 and 5 within the cooking chamber 36 of the enclosure interior 21. An exploded view of a skewer assembly 40 is shown in FIG. 6.

As shown best in FIG. 4, each of the skewer assemblies 40 comprises a support member 41 to which are suitably secured a plurality of U-shaped or yokelike upstanding skewers 42 arranged in longitudinally spaced, aligned relationship along the member 41. Each of the skewers 42 include a connecting member 42a and a pair of legs 42b, the upper ends of which are preferably beveled or pointed at 42c. Preferably, the skewers 42 are mounted on the support member 41 by securing the skewer connecting member 42a to the support member 41 in any suitable manner such as by welding or the like.

In order to support the skewer assemblies 40 within the enclosure interior 21, a plurality of upstanding pin members 43, 44 are suitably mounted on the frame cross members 31, 32 respectively as shown in FIG. 4 in uniform spaced-apart relationship. Corresponding pin members 43, 44 secured to the cross members 31, 32 are disposed in aligned relationship front to rear so as to constitute pairs of pin members, each pair being arranged for association with one of the skewer assemblies 40. Each end of the support rod member 41 of the skewer assembly is provided with an upstanding sleeve 46 which is engagable in telescopic relationship with the pair of pin members 43, 44 allowing the skewer assembly 40 to be easily moved for cleaning and transportation of the cooked meat.

The skewer assemblies 40 are specifically intended to support a cut of meat known as ribs in the cooking position as shown in FIGS. 2, 5, these rib sections being identified by the letter R. As can be readily understood, the rib sections R are impaled on the leg portions 42b of skewers 42 after the ribs have been punctured by the pointed ends 42c. In order to maintain the rib sections R in spaced relationship on the skewers 42 for proper cooking, a plurality of spacer sleeves 51 are provided which are arranged to be slipped telescopically on the skewer leg portions 42b. Thus as each rib section R is impaled on the skewer leg portions 42b, pairs of spacer sleeves 51 are successively slipped onto the leg portions thereby maintaining the rib sections R in the properly spaced relationship, as shown in FIGS. 2 and 5.

In order to support additional meat to be cooked such as large sections M of beef, chicken and the like, horizontally disposed rack means 48 are provided which are arranged to be removably supported in the enclosure interior 21 in overlying relationship with the skewer assemblies 40. In the illustrated embodiment, the rack means include at least one rack 48 which comprises a flat body member 52 on the marginal edge of which is provided an upstanding flange 53 as shown in FIG. 7. A pair of oppositely disposed handles 54 are also provided on the marginal edge of the body member 52 which facilitate the handling of the body member.

In order to locate and support the rack 48 in the cooking position of FIG. 2, the body member 52 is provided with a plurality of perforations or apertures 56 which are arranged to accommodate the pointed ends 42c of the skewer leg portions 42b. In the specific embodiment, two of such racks 48 are provided, each associated with three of the skewer assemblies 40 and when a rack 48 is loaded with large sections M of meat, it is positioned within the cooking chamber 36 of the enclosed interior 21 as shown best in FIG. 2 with the skewer ends 42c introduced into the apertures 56. Spacer sleeves 51 are provided on the skewer leg portions 42b, between the uppermost rib sections R and the skewer upper ends 42c, so that when the rack 48 is positioned in the cooking position with the skewer ends 42c in the apertures 56, the rack 48 is securely supported horizontally in the position shown in FIG. 2 on the upper ends of the spacer sleeves 51 for the cooking operation.

It should also be understood, that the apertures 56 in the rack 48 permit the free flow of cooking heat and smoke through the rack, thereby producing a uniform and thorough barbequeing of the meat sections M.

The cooking apparatus C also includes a pan or receptacle 57 having oppositely disposed side flanges 58 and 59 which are supported in the interior 21 in overlying relationship with combustion chamber 24. The pan 57 extends throughout substantially the entire area defined by frame members 31-34 and is constructed to contain water which is converted into steam by the heat from the combustion chamber and to catch grease dripping from the rib and meat sections R and M respectively.

Means are provided for removably supporting the receptacle 57 in interior 21 which, in the illustrated embodiment, comprises a plurality of inwardly directed, horizontally disposed support members or posts 61, suitably secured by welding or the like to the inner wall of frame side members 28, 29 respectively as shown best in FIG. 2. When the receptacle 57 is introduced into the interior 21, the support posts 61 engage in underlying supporting relationship with the side flanges 58, 59 on the pan 57 permitting the receptacle 57 to be moved into interior 21 or withdrawn for cleaning in the direction shown by arrows P. The pan 57 is provided with drain means 64 by means of which the grease collected in the receptacle may be withdrawn into suitable containers or the like (not shown) for removal.

The combustion chamber 24 is arranged to contain a suitable fuel for the barbequeing operation, such as charcoal 66 and hickory logs 67, the ignition of which may be accomplished by suitable means such as a gas fired ignitor 68 as shown in FIG. 2.

In the operation of the cooking apparatus of the invention, after the rib and meat sections R, M have been suitably mounted within the cooking chamber 36 of the interior 21, the receptacle 57 is filled with water and the charcoal 66 and logs 67 which have been loaded into the combustion chamber 24 are ignited with the ignitor 68. With the burning of charcoal and logs, heat and smoke is generated which travels upwardly around the receptacle 57 in the direction of the arrows S shown in FIG. 2. It will be noted that a path for the cooking heat and smoke is provided between the receptacle flanges 58 and 59 and the side walls 12, 13 of the housing 10. At the same time, an additional path is provided between the front and rear portions of the receptacle 57 and the front and rear walls 14, 16. As a result of the heating of the water in the receptacle, steam is produced which combines with the smoke to materially enhance the cooking process by entraining the smoke particles and providing uniform heat transfer in a known manner.

Outstanding results are obtained with the cooking apparatus C of the invention in that not only is manual labor rereduced in loading and unloading the meat sections R, M, but three hundred pounds of meat or more may be cooked in a single operation compared with a conventional barbeque pit of similar dimensions wherein only approximately seventy-five pounds of meat in a single loading is processed. In addition, the cooking operation only requires eighty to one hundred pounds of charcoal and six to eight twenty-four inch split hickory logs representing only about twenty-five percent of the amount of such fuel used in present day apparatus. Furthermore, the use of smoke laden steam to cook a large quantity of meat with the apparatus of the invention provides a uniform quality in the resulting product as far as taste, color and tenderness is concerned. Present day apparatus requires two separate operations, i.e., cooking and smoking as opposed to the single operation of the cooking apparatus of the invention.

The cooking apparatus of the invention requires no turning, basting, or continuous heat regulation and a major fire hazard common to conventional barbeque pits is eliminated by the collection of the grease and drippings in the humidifying pan 57, which otherwise would coat the cooking surfaces producing a fire hazard. Furthermore, by providing a drain 64 in the humidifying pan, the cooking apparatus of the invention may be retained in a relatively clean condition, thereby eliminating health hazards that are common to conventional barbeque pits.

While the preferred embodiment of the invention has been disclosed, it is understood that the invention is not limited to such an embodiment since it may be otherwise embodied in the scope of the appended claims.

What is claimed is:

1. Cooking apparatus for barbequeing meat and the like, comprising, in combination, a housing including a frame being provided with front, rear, and side walls defining an enclosure, a combustion chamber defined in the lower portion of said enclosure having an open upper end for transmitting heat and smoke, a receptacle mounted to said housing over said combustion chamber, means for removably supporting said receptacle in said enclosure interior in overlying relationship with said combustion chamber, a plurality of elongated skewer assemblies removably mounted to said housing, each skewer assembly comprising a support member and a plurality of vertically extending skewers secured to said support member for supporting meat such as ribs to be cooked, horizontally disposed rack means removably supported in said enclosure interior mounted to said skewer assemblies in overlying relationship with said skewer assemblies for supporting additional meat to be cooked, said rack means comprising a planar surface defining a plurality of apertures allowing gases to pass therethrough and means on said frame for removably supporting said plurality of skewer assemblies in side-by-side relationship in said enclosure above said receptacle.

2. Cooking apparatus in accordance with claim 1, including a gas-fired ignitor in said combustion chamber.

3. Cooking apparatus in accordance with claim 1, including drain means in said receptacle for removing the grease collected during a cooking process.

4. Cooking apparatus in accordance with claim 1, wherein said receptacle supporting means comprises inwardly directed spaced-apart support members secured to opposite sides of said frame within said enclosure interior and horizontally extending inward to engage and, outwardly directed flanges defined on opposite sides of said receptacle.

5. Cooking apparatus in accordance with claim 1 including mounting means for supporting said skewer assemblies comprising an upstanding sleeve on each end of said support member, a plurality of upstanding pin members on said frame disposed in spaced-apart relationship within, said pin members being arranged in aligned pairs for accommodating said support member sleeves to removably support said skewer assemblies in said side-by-side parallel relationship between said enclosure side walls.

6. Cooking apparatus in accordance with claim 5 wherein each of said skewers is of "U"-shaped configuration having a connecting member and a pair of upstanding legs, said connecting member being secured to said support member.

7. Cooking apparatus in accordance with claim 6, including a plurality of spacer sleeves telescopically engageable with said skewer leg portions, said spacer sleeves being disposed on said legs between individual sections of meat to be cooked to maintain said meat sections in spaced-apart relationship during a cooking operation.

8. Cooking apparatus in accordance with claim 1 wherein the apertures of said rack means are positioned to accommodate the upper ends of skewer legs of said skewer assemblies for supporting meat thereon in a horizontally disposed cooking position.

9. Cooking apparatus for barbequeing meat and the like comprising, in combination, a housing including a frame said housing being provided with front, rear and side walls defining a sectioned interior, one of said interior sections forming a combustion chamber in the lower portion for burning fuel such as coal, logs and the like to provide cooking heat and smoke, a receptacle having drain means and outwardly extending flanges on opposite sides thereof removably mounted to said housing, said receptacle being positioned within said enclosure adjacent the top of said combustion chamber to collect grease from meat and to transfer heat from said combustion chamber, a plurality of skewer assemblies for supporting meat to be cooked removably mounted to said housing, each of said skewer assemblies comprising a support member, an upstanding sleeve on each end of said support member and a plurality of skewers secured to said support member in longitudinally spaced, aligned relationship, a pin means secured to said housing, said pin means comprising pin members being arranged to hold the sleeves of said skewer assemblies in a fixed position above said receptacle, a plurality of spacer sleeves slidably mounted on said skewers adapted to space meat portions from each other, at least one rack for supporting additional portions of meat to be cooked, said rack comprising a substantially flat body defining a plurality of apertures therein, said apertures being arranged to accommodate the upper ends of said skewer, said spacer sleeves being additionally disposed on said skewers to maintain said body member in spaced-apart relationship with the uppermost sections of meat on said skewer assemblies during a cooking operation.

10. Cooking apparatus for barbequeing meat and the like comprising, in combination, a housing including a frame having an interior, said housing being provided with front, rear and side walls defining a sectioned interior, said wall including a plurality of movable panels mounted thereto, one of said interior sections forming a combustion chamber in the bottom portion of said interior for burning fuel such as coal, logs and the like to provide cooking heat and smoke, a receptacle having drain means mounted thereto and defining outwardly extending flanges on opposite sides thereof removably mounted on a plurality of pins extending inward from said frame, said receptacle being positioned within said enclosure adjacent the top of said combustion chamber to collect grease from the cooking meat and to transfer heat from said combustion chamber converting water contained therein to steam drain means connected to said receptacle adapted to drain grease and contaminates from said receptacle, a plurality of skewer assemblies for supporting meat to be cooked removably mounted to said housing, each of said skewer assemblies comprising a rod shaped support member, an upstanding sleeve secured to each end of said rod shaped support member and a plurality of "U"-shaped skewers secured to said rod shaped member in longitudinally spaced, aligned relationship, a plurality of upstanding spaced-apart pin members secured to said frame adjacent opposite walls of said housing, said pin members being arranged in associated pairs for holding said support member sleeves of one of said skewer assemblies to position each skewer assembly in a fixed position above said receptacle, a plurality of spacer sleeves slidably mounted on said skewers adapted to space meat portions from each other, at least one rack for supporting additional portions of meat to be cooked, said rack comprising a substantially flat body defining a plurality of apertures therein, said apertures being arranged and dimensioned to accommodate the upper ends of said skewer, said spacer sleeves being disposed on said skewer to maintain individual sections of meat in spaced-apart relationship and to maintain said rack body in spaced-apart relationship from the uppermost portions of meat on said skewer assemblies during a cooking operation.

11. Cooking apparatus for barbequeing meat and the like, comprising, in combination, a housing including a frame being provided with front, rear, and side walls defining an enclosure, a combustion chamber defined in the lower portion of said enclosure having an open upper end for transmitting heat and smoke, a receptacle mounted to said housing over said combustion chamber, means for removably supporting said receptacle in said enclosure interior in overlying relationship with said combustion chamber, a plurality of elongated skewer assemblies removably mounted to said housing, each skewer assembly comprising a support member, an upstanding sleeve secured to each end of said support members and a plurality of vertically extending skewers secured to said support member for supporting meat such as ribs to be cooked and means on said each of said skewers comprising a connecting member and at least two upstanding legs secured to said connecting member, and means on said frame for removably supporting said plurality of skewer assemblies in side-by-side relationship in said enclosure above said receptacle, said frame support means comprising a plurality of upstanding pin members on said frame disposed in spaced-apart relationship within, said pin members being arranged in aligned pairs for accommodating said support member sleeves to support said skewer assemblies in said side-by-side parallel relationship between said enclosure side walls.

12. Cooking apparatus in accordance with claim 11, including a plurality of spacer sleeves telescopically engageable with said skewer leg portions, said spacer sleeves being disposed on said legs between individual sections of meat to be cooked to maintain said meat sections in spaced-apart relationship during a cooking operation.

* * * * *